United States Patent
Chang et al.

(10) Patent No.: US 9,087,176 B1
(45) Date of Patent: Jul. 21, 2015

(54) STATISTICAL OVERLAY ERROR PREDICTION FOR FEED FORWARD AND FEEDBACK CORRECTION OF OVERLAY ERRORS, ROOT CAUSE ANALYSIS AND PROCESS CONTROL

(71) Applicant: KLA-Tencor Corporation, Milpitas, CA (US)

(72) Inventors: Wei Chang, Milpitas, CA (US);
Krishna Rao, Milpitas, CA (US);
Joseph Gutierrez, Milpitas, CA (US);
Ramon Olavarria, Milpitas, CA (US);
Craig Macnaughton, Milpitas, CA (US); Amir Azordegan, Mipitas, CA (US); Prasanna Dighe, Milpitas, CA (US); Jaydeep Sinha, Livermore, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 14/220,665

(22) Filed: Mar. 20, 2014

Related U.S. Application Data

(60) Provisional application No. 61/949,022, filed on Mar. 6, 2014.

(51) Int. Cl.
| | |
|---|---|
| G06F 17/50 | (2006.01) |
| G03F 7/20 | (2006.01) |
| G03F 1/36 | (2012.01) |
| G03F 1/00 | (2012.01) |

(52) U.S. Cl.
CPC ............ *G06F 17/5081* (2013.01); *G03F 1/144* (2013.01); *G03F 1/36* (2013.01); *G03F 7/705* (2013.01); *G06F 17/5068* (2013.01); *G06F 2217/12* (2013.01)

(58) Field of Classification Search
USPC .......... 716/52, 50, 51; 382/144, 145; 700/121
See application file for complete search history.

(56) References Cited

U.S. PATENT DOCUMENTS

| | | | |
|---|---|---|---|
| 2010/0083200 A1* | 4/2010 | Song et al. .......... | 716/5 |
| 2010/0112467 A1* | 5/2010 | Chung ............ | 430/30 |
| 2013/0028517 A1* | 1/2013 | Yoo et al. ........ | 382/173 |
| 2013/0089935 A1 | 4/2013 | Vukkadala et al. | |

* cited by examiner

*Primary Examiner* — Stacy Whitmore
*Assistant Examiner* — Magid Dimyan
(74) *Attorney, Agent, or Firm* — Suiter Swantz pc llo

(57) ABSTRACT

A method to collect data and train, validate and deploy statistical models to predict overlay errors using patterned wafer geometry data and other relevant information includes selecting a training wafer set, measuring at multiple lithography steps and calculating geometry differences, applying a plurality of predictive models to the training wafer geometry differences and comparing predicted overlay to the measured overlay on the training wafer set. The most accurate predictive model is identified and the results fed-forward to the lithography scanner tool which can correct for these effects and reduce overlay errors during the wafer scan-and-expose processes.

20 Claims, 4 Drawing Sheets

US 9,087,176 B1

STATISTICAL OVERLAY ERROR PREDICTION FOR FEED FORWARD AND FEEDBACK CORRECTION OF OVERLAY ERRORS, ROOT CAUSE ANALYSIS AND PROCESS CONTROL

PRIORITY

The present application claims the benefit under 35 U.S.C. §119(e) of U.S. Provisional Application Ser. No. 61/949,022, filed Mar. 6, 2014, which is incorporated herein by reference.

FIELD OF THE INVENTION

The present invention is directed generally toward semiconductor wafer fabrication and more particularly toward error identification and correction methods in fabrication.

BACKGROUND OF THE INVENTION

A wafer generally goes through certain processes including deposition, etching, chemical-mechanical polishing (CMP) etc., before it is sent into a lithography scanner for exposure. Overlay errors are measured after the exposure using tools such as TWINSCAN, Archer 500 or some other appropriate device.

Lithography overlay and critical dimension uniformity (CDU) are critical parameters in semiconductor manufacturing which can adversely affect integrated circuit performance and wafer yield. Overlay errors can be caused by lithography scanner tools, mask or reticle, and process induced wafer geometry changes during scan and expose operation or other similar sources. With shrinking logic and memory device dimensions, overlay errors increasingly consume a significant fraction of the total overlay budget for critical layers. Significant efforts have been expended to identify and minimize systematic sources of overlay errors.

One method of minimizing systematic overlay errors is to use high resolution wafer geometry measurements to identify and monitor wafer fabrication processes and identify wafer geometry changes that can be fed forward to the scanner to counteract the impact of the wafer geometry changes (along with other correctible factors) during the scan and expose operation.

Analytical mechanics models, numerical finite-element models and other such methodologies have been used to make overlay predictions. However these methods suffer from the high complexity of the physical processes. Furthermore, they impact the wafer geometry that they seek to model and may not be usable to consistently predict reliable scanner corrections to counteract incoming wafer geometry changes.

Consequently, it would be advantageous if a method and apparatus existed that is suitable for consistently predicting overlay errors in a consistent wafer fabrication process and apply appropriate corrections to subsequent wafer fabrications.

SUMMARY OF THE INVENTION

Accordingly, the present invention is directed to a novel method and apparatus for consistently predicting overlay errors in a consistent wafer fabrication process and apply appropriate corrections to subsequent wafer fabrications.

In at least one embodiment, an overlay prediction system accurately predicts corrections by determining wafer geometry changes based on measurements of the wafer before and after lithography processes, applying a plurality of predictive models and comparing the predictive models to actual overlay errors to determine which predictive model produces the most accurate result. The identified predictive model is then used to predict overlay errors in subsequent wafer fabrication for the same batch of wafers. In another embodiment, a validation wafer is used to verify the identified predictive model.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
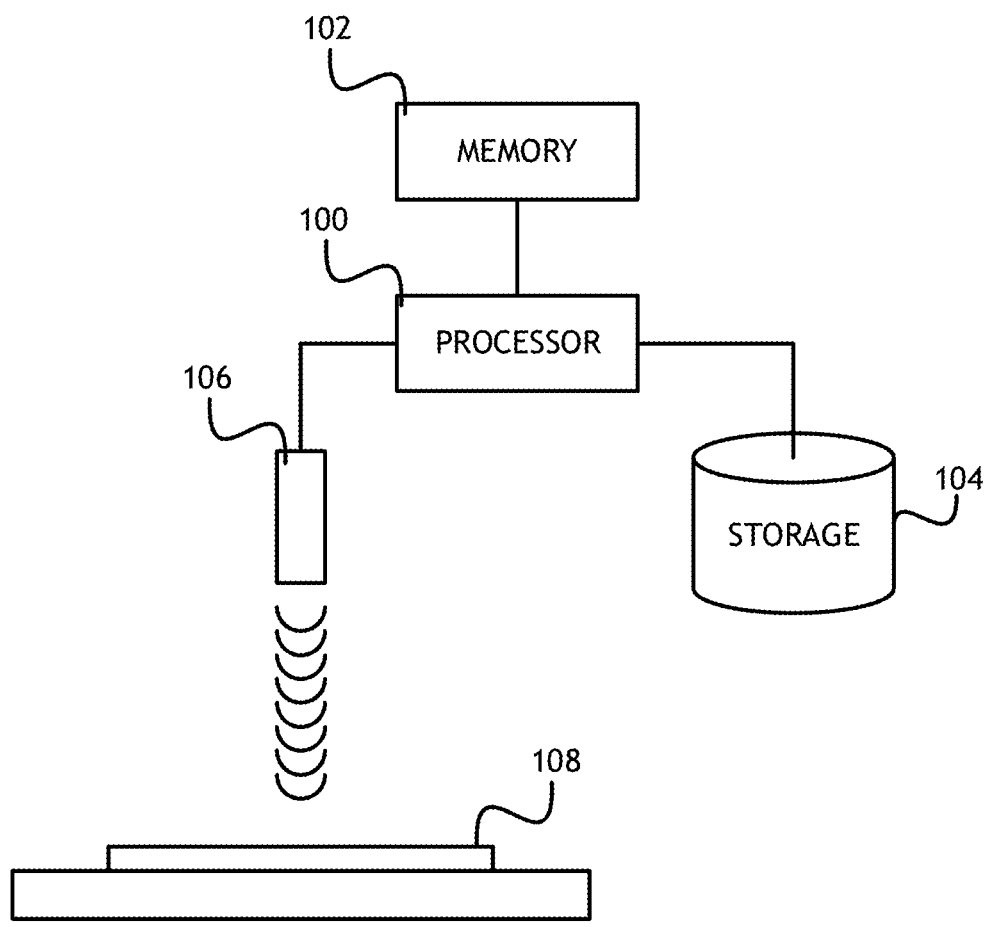
FIG. 1 shows a block diagram of a lithographic computer system useful for implementing at least one embodiment of the present invention.

Referring to FIG. 1, a block diagram of a lithographic computer system useful for implementing at least one embodiment of the present invention is shown. In at least one embodiment of the present invention, a computer system for scanning wafers and determining a predictive model of overlay errors in a wafer fabrication process includes a processor 100, memory 102 connected to the processor 100 for storing and executing computer executable program code and a camera 106 or other wafer scanning device for scanning a wafer 108 geometry and for analyzing overlay errors in a wafer 108 after an overlay exposure process. The computer system may also include a data storage device 104 connected to the processor 100 for storing predictive models and the results of applying such predictive models to a scanned wafer 108 geometry.

Figure 2:
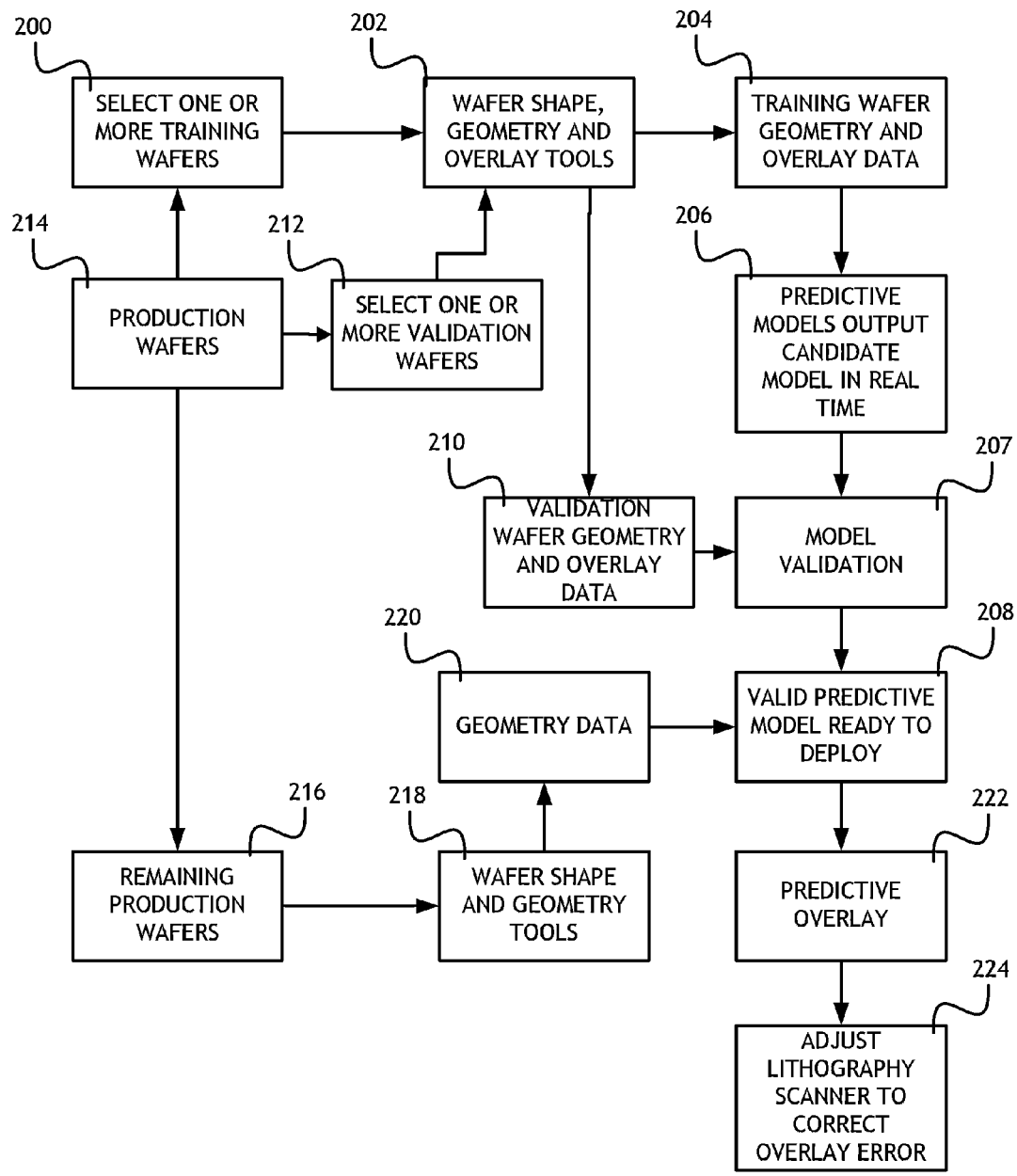
FIG. 2 shows a flowchart of a method for error prediction in a semiconductor wafer fabrication process.

Referring to FIG. 2, a flowchart of a method for error prediction in a semiconductor wafer fabrication process is shown. In at least one embodiment of the present invention, one or more training wafers are selected 200 from a batch of production wafers 214 produced by or during the same or substantially similar fabrication process. In at least one embodiment, the batch of wafers produced by or during the same fabrication process are also intended for the same scan-and-expose overlay procedures.

A dynamically smart sampling strategy may be employed to select training wafers. Patterned wafer geometry parameters such as wafer shape and geometry are obtained 202 for the training wafers using a patterned wafer geometry metrology tool. Training wafers may also undergo homogeneity testing. If the training wafers behave heterogeneously (for example due to different chambers of a multi-chamber process tool imparting different process signatures on the wafers in a single lot), statistical clustering techniques such as K-means and Gaussian mixture model may be applied to separate training wafers into several homogenous groups. Homogeneity is critical for determining a replicatable predictive model.

A predictive modeling engine runs advanced predictive models including but not limited to neural network, random forest, boosted regression tree, support vector machine and generalized linear models. Those models take a large number of process dependent variables, including a multitude of high spatial resolution wafer geometry parameters, as input variables such as but not limited to wafer flatness, thickness, shape, and their first or higher order derivatives, difference in shape (post-process minus pre-process), shape residual (post 2nd order removal) and other relevant process information (such as but not limited to chip layout, film-stack thickness and other properties, lithography scanner settings, etc.) Different statistic models have different assumptions and restrictions on the function space f.

The predictive results from statistical models help engineers understand the contribution of and correlation between various process factors to overlay errors at downstream scan-and-expose operations. The fitting parameters of the predictive model can trigger further investigation of the relationship between the wafer geometry changes and overlay errors.

An overlay process is performed on the one or more training wafers and the one or more training wafers are analyzed 204 for actual overlay errors. The measured lithography overlay errors are used to develop complex highly non-linear relationships or predictive models intended to minimize overlay errors. The actual overlay errors are then compared 206 to the predicted overlay errors based on the predictive models in real time to produce a candidate predictive model that most closely matches the actual overlay errors. The prediction accuracy is measured by Pearson correlation between the predicted overlay errors and the actual overlay errors. The model with the best prediction accuracy will be retained as the candidate model.

The predictive methodology of the present invention is point-to-point geometry information at a particular wafer coordinate corresponds to an overlay error at wafer coordinate. The statistically predictive models allow for flexible experimentation. The number of training wafers and the number of sample locations on the training wafers can be gradually increased until reaching reliable prediction performance. In the training phase, wafer geometry and process characteristics of interest are identified. Different sampling strategies based on those characteristics may be rapidly tested to converge to the most optimal prediction performance in terms of accuracy and reliability. Optimal sampling may define the minimum number of points at which wafer geometry changes need to be measured and thus reduce cycle time and increase tool productivity.

Once a candidate model is determined, one or more validation wafers are selected 212 from the production wafers 214 and patterned wafer geometry parameters are obtained 202 for the validation wafers using a patterned wafer geometry metrology tool. An overlay process is performed on the one or more validation wafers and the one or more validation wafers are analyzed 210 for actual overlay errors. The candidate model predicts the overlay errors and compares them with the actual overlay errors on the validation wafers. If the prediction accuracy satisfies 207 certain thresholds based on the overlay budget and other considerations, the candidate model is considered to be valid and ready to be deployed 208 to predict overlay errors on other production wafers which share similar processing conditions with the training and validation wafers.

Once the candidate model is validated 207, the remaining production wafers 216 are scanned 218 with a patterned wafer geometry metrology tool to determine 220 wafer geometry parameters. Based on the wafer geometry parameters and the deployed predictive model 208, the system predicts 222 an overlay error for the remaining production wafers and adjusts 224 the lithography scanner to correct the predicted overlay error. Point-to-point prediction is crucial for feeding forward the predicted overlay, applying the adjustment 224 and hence reducing the actual overlay error after the exposure.

Methods according to the present invention may allow a lithography production process to preemptively correct for overlay errors without intensive processing of each individual wafer.

Figure 3:
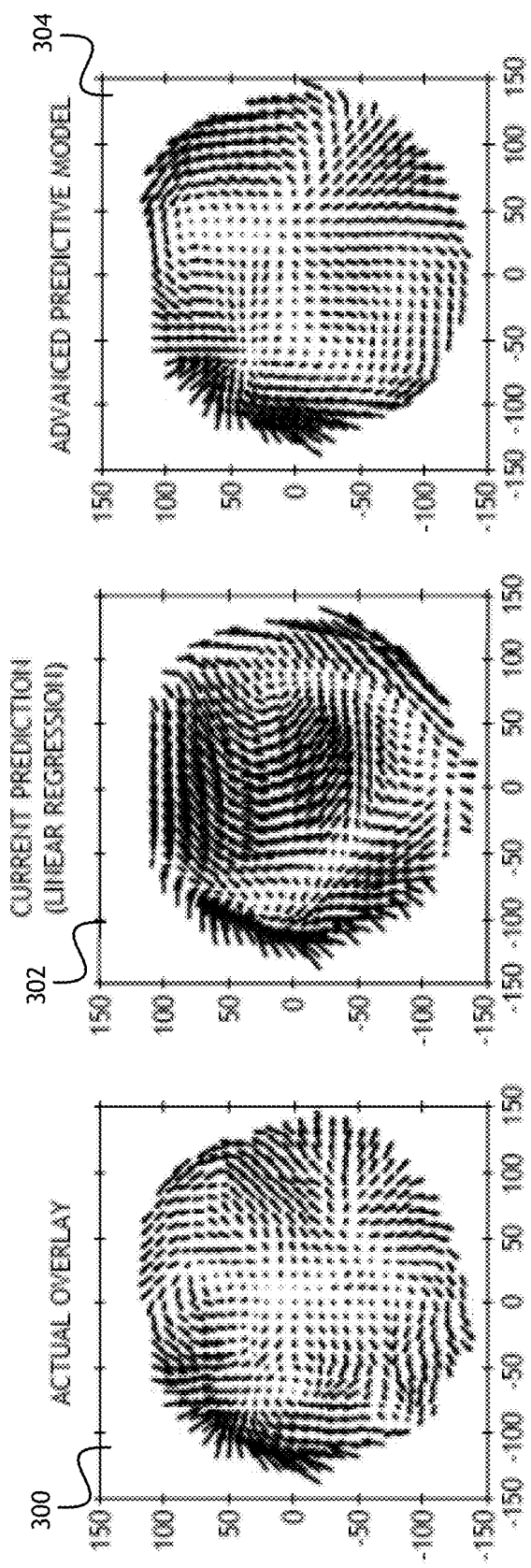
FIG. 3 shows an exemplary output of an error prediction process according to at least one embodiment of the present invention.

Referring to FIG. 3, an exemplary output of an error prediction process according to at least one embodiment of the present invention is shown. Current linear regression prediction methodology predicts an overlay error pattern 302 substantially different from an actual overlay error pattern 300. By contrast, methods according to the present invention using advanced predictive models generate an overlay error pattern 304 more closely correlated with the actual overlay error pattern 300. In this exemplary embodiment, the advanced predictive model utilized neural networks.

Figure 4:
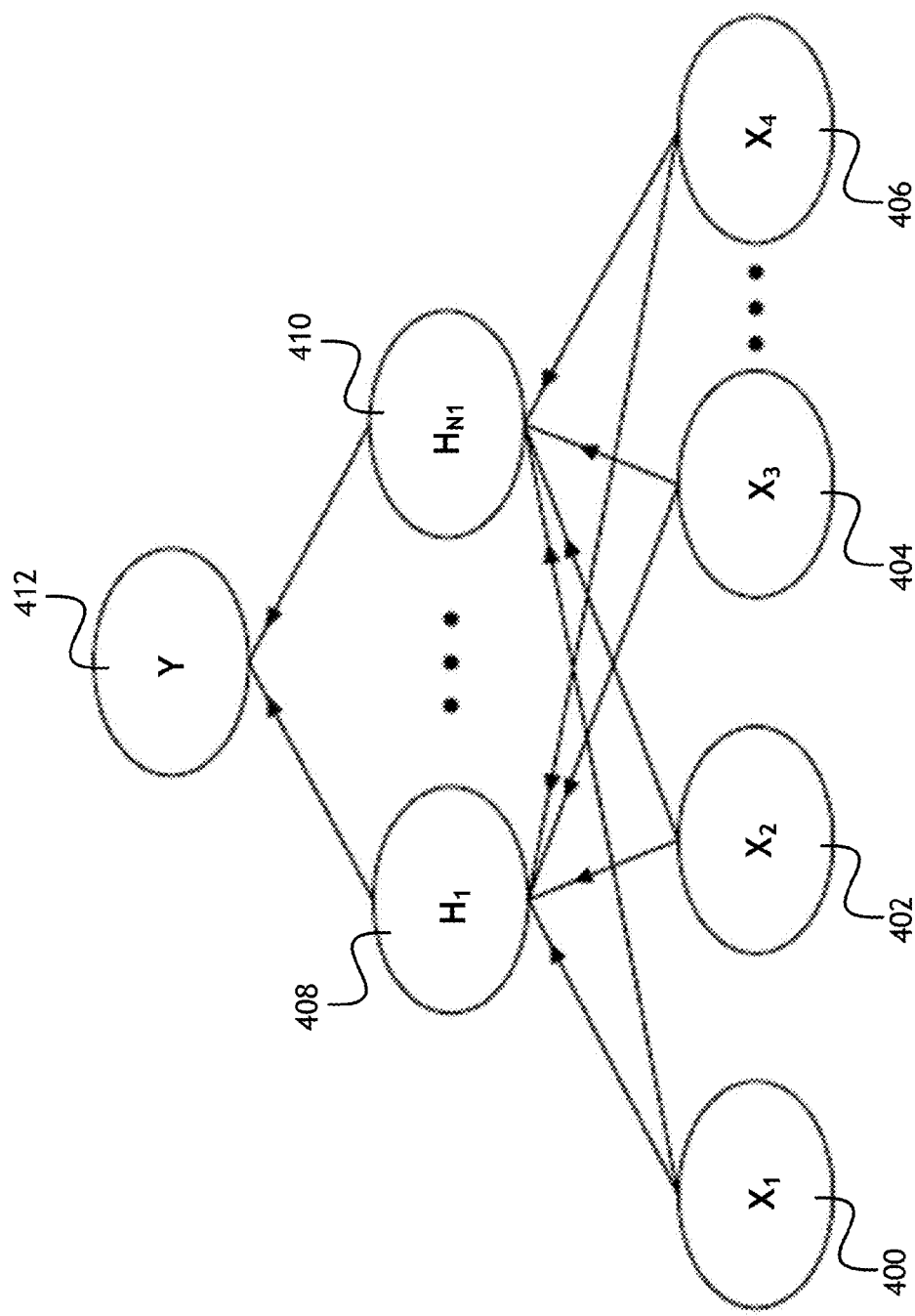
FIG. 4 shows a block diagram of a neural network according to at least one embodiment of the present invention.

Referring to FIG. 4, a block diagram of a neural network according to at least one embodiment of the present invention is shown. In at least one embodiment, a neural network comprises a plurality of input variables $X_1$ 400, $X_2$ 402, $X_3$ 404, $X_4$ 406 such as IPD, shape, slope etc. The linear combination $Z_j = \Sigma_i^{n2} w_{ij} X_i$ is passed as a stimulus to neuron $H_1$ 408 in the hidden layer. An activation function embedded in each neuron abstractly represents a biological rate of action potential firing in the neuron. A commonly used activation function is the SIGMOID function $O_j = 1/1 + \exp(z_j)$, where $O_j$ is the output from neuron $H_j$. The predicted overlay output cell Y 412 is the collection of the outcomes from all neurons $H_1$ 408 . . . $H_{N1}$ 410 in the hidden layer. In at least one embodiment, the overlay output cell is defined by $Y = \Sigma_k^{n1} v_k O_k$. The overlay output cell 412 and the input variable 400, 402, 404, 406 may exhibit highly non-linear structure.

Mathematical structure in a neural network can also suggest how the output behaves depending on certain input. Assuming a neural network with two input variables, for example $X_1$ 400 and $X_2$ 402, and three neurons 408, 410 in the hidden layer, the first derivative of output Y 412 with reference to the first input variable X1 400 is defined by:

$$\partial y / \partial x_1 = v_1 w_{11} O_1 (1-O_1) + v_2 w_{12} O_2 (1-O_2) + v_3 w_{13} O_3 (1-O_3)$$

The result is a three mode curve, suggesting the overlay is sensitive to input variable X1 400 in three areas. An engineer may determine which conditions are most pertinent to overlay errors in a particular geometry and how an overlay reacts to geometry parameters.

In one embodiment, the relative importance of each input variable in a predictive model is determined by a procedure in a statistical package. Input variables are ranked based on the reduction in variance of the predicted overlay attributable to each variable, via a sensitivity analysis. A prediction score may be defined by:

$$\text{Score}_i = V(E(Y|X_i))/V(Y)$$

which is the ratio of expected variance of predicted overlay given certain variable value $X_i$ to the unconditional variance of the predicted overlay. Once the relative importance of each variable is determined, engineers can modify the production process or further investigate why other variables affect overlay.

In a real world production system, wafers may have characteristics that are non-uniform such as film stress and higher order in-plane displacement as a result of non-uniform variation in wafer geometry and process variations. Therefore, the correlation between input variables such as wafer geometry and output such as overlay can exhibit convoluted non-linearity. In that case, a predictive model which models the non-linear correlation can improve prediction accuracy. Neural networks can therefore improve predictive accuracy over linear regression.

Methods according to at least one embodiment of the present invention may be employed to study a relationship between wafer geometry changes and overlay error, and identify dominant geometry components that affect lithography overlay and lithography critical dimension uniformity.

Methods according to at least one embodiment of the present invention may be used to identify a root cause of overlay errors. All process related parameters, such as wafer flatness, thickness, shape, and the first or higher order derivatives of those parameters, differences in shape, and shape residual may be considered using the predictive model process described herein. Some appropriate variable select algorithm, such as ElasticNet, forward-stepwise regression or least angle regression, may systematically rule out non-essential or noisy parameters in the predictive model selection process and converge to the more impactful sources of overlay errors. Similar methods may be applied to other relevant process parameters such as chip layout, film-stack thickness and other film-stack properties, lithography scanner settings, including translation, rotation, magnification, orthogonality, wafer tilt, etc.

Methods according to at least one embodiment of the present invention may reveal process variations that can be used to monitor process excursions. Clustering techniques can separate wafers into different groups. Assuming a stable production process results in similar overlay maps within each group, engineers may identify a process excursion by monitoring the characteristics of each group.

Systems according to embodiments of the present invention may leverage statistically predictive models, which in addition to improved overlay correction prediction capability may also identify the impact of wafer fabrication unit processes such as scan-and-expose including reticle effects, chemical mechanical polishing, rapid thermal processing and other semiconductor processes that contribute to overlay errors.

It is believed that the present invention and many of its attendant advantages will be understood by the foregoing description of embodiments of the present invention, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:
1. A computer system comprising:
a processor;
memory connected to the processor; and
computer executable program code configured to execute on the processor,
wherein the computer executable program code configures the processor to:
receive one or more training wafer profiles corresponding to one or more error correlated parameters of one or more training wafers, such error correlated parameters comprising at least one of a wafer shape, a wafer flatness, a chip layout, a film stack thickness, and a lithography scanner setting;
apply a plurality of overlay error predictive models to the training wafer profiles to produce corresponding predicted overlay error profiles;
receive one or more training wafer error profiles;
compare the training wafer error profiles to the plurality of predicted overlay error profiles to determine a best fit overlay error predictive model from the plurality of overlay error predictive models; and
determine a correction to a lithographic overlay process based on the best fit overlay error predictive model.

2. The computer system of claim 1, wherein the computer executable program code further configures the processor to:
receive one or more validation wafer profiles corresponding to one or more error correlated parameters of one or more validation wafers;
apply the best fit overlay error predictive model to the validation wafer profiles to produce one or more predicted valid overlay error profiles;
receive one or more validation wafer error profiles;
compare the validation wafer error profiles to the predicted valid overlay error profiles;
determine that the validation wafer error profiles differ from the predicted valid overlay error profiles by a quantity less than some threshold.

3. The computer system of claim 1, wherein the computer executable program code further configures the processor to apply the correction to subsequent lithographic overlay processes of one or more production wafers.

4. The computer system of claim 1, wherein applying the plurality of overlay error predictive models comprises executing a neural network based on the one or more error correlated parameters.

5. The computer system of claim 1, wherein applying the plurality of overlay error predictive models comprises executing a random forest algorithm on the one or more error correlated parameters.

6. The computer system of claim 1, wherein the computer executable program code further configures the processor to:
determine that the training wafer profiles represent heterogeneous error correlated parameters; and
organize the training wafer profiles into homogeneous error correlated parameters.

7. The computer system of claim 1, wherein the computer executable program code further configures the processor to analyze the one or more training wafer profiles to determine a primary geometry parameter responsible for an overlay error.

8. A metrology system comprising:
a processor;
a wafer scanning device connected to the processor;
memory connected to the processor; and
computer executable program code configured to execute on the processor, wherein the computer executable program code configures the processor to:
scan one or more training wafers to determine one or more error correlated parameters of the training wafers, such error correlated parameters comprising at least one of a wafer shape, a wafer flatness, a chip layout, a film stack thickness, and a lithography scanner setting;

produce one or more training wafer profiles corresponding to the one or more error correlated parameters of one or more training wafers;

apply a plurality of overlay error predictive models to the training wafer profiles to produce corresponding predicted overlay error profiles;

scan the one or more training wafer to determine one or more training wafer error profiles error profiles;

compare the training wafer error profiles to the plurality of predicted overlay error profiles to determine a best fit overlay error predictive model from the plurality of overlay error predictive models; and determine a correction to a lithographic overlay process based on the best fit overlay error predictive model.

9. The metrology system of claim 8, wherein the computer executable program code further configures the processor to:

scan one or more validation wafers to determine one or more validation wafer profiles corresponding to one or more error correlated parameters of one or more validation wafers;

apply the best fit overlay error predictive model to the validation wafer profiles to produce one or more predicted valid overlay error profiles;

scan one or more validation wafers to determine one or more validation wafer error profiles;

compare the validation wafer error profiles to the predicted valid overlay error profiles;

determine that the validation wafer error profiles differ from the predicted valid overlay error profiles by a quantity less than some threshold.

10. The metrology system of claim 8, further comprising a lithographic overlay exposure device connected to the processor, wherein the computer executable program code further configures the processor to apply the correction to the lithographic overlay exposure device during a subsequent lithographic overlay processes of one or more production wafers.

11. The metrology system of claim 8, wherein applying the plurality of overlay error predictive models comprises executing a neural network based on the one or more error correlated parameters.

12. The metrology system of claim 8, wherein applying the plurality of overlay error predictive models comprises executing a random forest algorithm on the one or more error correlated parameters.

13. The metrology system of claim 8, wherein the computer executable program code further configures the processor to:

determine that the training wafer profiles represent heterogeneous error correlated parameters; and organize the training wafer profiles into homogeneous error correlated parameters.

14. The metrology system of claim 8, wherein the computer executable program code further configures the processor to analyze the one or more training wafer profiles to determine a primary geometry parameter responsible for an overlay error.

15. A method for compensating for overlay errors comprising:

scanning one or more training wafers to determine one or more error correlated parameters of the training wafers;

producing one or more training wafer profiles corresponding to the one or more error correlated parameters of one or more training wafers, such error correlated parameters comprising at least one of a wafer shape, a wafer flatness, a chip layout, a film stack thickness, and a lithography scanner setting;

applying a plurality of overlay error predictive models to the training wafer profiles with a computer processor to produce corresponding predicted overlay error profiles;

scanning the one or more training wafer to determine one or more training wafer error profiles error profiles;

comparing the training wafer error profiles to the plurality of predicted overlay error profiles with a computer processor to determine a best fit overlay error predictive model from the plurality of overlay error predictive models; and determining a correction to a lithographic overlay process based on the best fit overlay error predictive model with a computer processor.

16. The method of claim 15, further comprising scanning one or more validation wafers to determine one or more validation wafer profiles corresponding to one or more error correlated parameters of one or more validation wafers;

applying the best fit overlay error predictive model to the validation wafer profiles to produce one or more predicted valid overlay error profiles;

scanning one or more validation wafers to determine one or more validation wafer error profiles;

compare the validation wafer error profiles to the predicted valid overlay error profiles;

determine that the validation wafer error profiles differ from the predicted valid overlay error profiles by a quantity less than some threshold.

17. The method of claim 15, wherein applying the plurality of overlay error predictive models comprises executing a neural network based on the one or more error correlated parameters.

18. The method of claim 15, wherein applying the plurality of overlay error predictive models comprises executing a random forest algorithm on the one or more error correlated parameters.

19. The method of claim 15, further comprising:

determining that the training wafer profiles represent heterogeneous error correlated parameters; and organizing the training wafer profiles into homogeneous error correlated parameters.

20. The method of claim 15, further comprising analyzing the one or more training wafer profiles to determine a primary geometry parameter responsible for an overlay error.

* * * * *